US006537931B1

(12) United States Patent
Pflug et al.

(10) Patent No.: US 6,537,931 B1
(45) Date of Patent: Mar. 25, 2003

(54) DURABLE COATED FABRIC, METHOD OF MAKING SAME AND PRODUCTS INCORPORATING SAME

(76) Inventors: Robert E. Pflug, 305 Thornhill Dr., Spartanburg, SC (US) 29301; J. Travis Dorn, Jr., 703 N. Main st., Abbeville, SC (US) 92620

( * ) Notice: Subject to any disclaimer, the term of this patent is extended or adjusted under 35 U.S.C. 154(b) by 0 days.

(21) Appl. No.: 09/512,008

(22) Filed: Feb. 24, 2000

(51) Int. Cl.⁷ .............................. B05B 5/00; B32B 3/00
(52) U.S. Cl. .................... 442/59; 156/244.23; 190/125; 427/161; 442/62; 442/286; 442/288
(58) Field of Search ............................ 427/161; 442/59, 442/62, 286, 288; 156/244.23; 190/125

(56) References Cited

U.S. PATENT DOCUMENTS

| | | | | |
|---|---|---|---|---|
| 3,022,189 A | * | 2/1962 | Malmquist | 442/59 |
| 3,713,936 A | | 1/1973 | Ramsay | |
| 4,325,469 A | | 4/1982 | Gurian | |
| 5,382,461 A | | 1/1995 | Wu | |

FOREIGN PATENT DOCUMENTS

| | | | |
|---|---|---|---|
| DE | 30 11 123 | 10/1981 | |
| EP | 0 305 207 | 3/1989 | |
| GB | 1 408 917 | 10/1975 | |
| GB | 1 536 421 | 12/1978 | |
| GB | 2 243 288 | 10/1991 | |
| JP | 46-41835 | * 12/1971 | 427/161 |

OTHER PUBLICATIONS

Database wpi section ch, week 199151 Derwent Publications Ltd, London, GB; XP002171061 & JP 03 249283 A (Achilles Corp) Nov. 7, 1991 abstract.
Database wpi section ch, week 199113 Derwent Publications Ltd, London, GB; Class A14, an 1991–092185 XP002171062 & JP 03 038340 A (two & one KK), Feb. 19, 1991 abstract.
European Patent Office; international search report for PCT/US 01/05370; dated Jul. 20, 2001. Not a Reference.

* cited by examiner

Primary Examiner—John J. Gallagher
(74) Attorney, Agent, or Firm—Terry T. Moyer; Brenda D. Wentz

(57) ABSTRACT

A coated fabric having desirable weight and high durability, and particular utility in the manufacture of linings for particular articles is described. The fabric has a textile substrate which is coated to provide a structure having an abrasion resistance of at least about 750 cycles to failure when tested according to ASTM D 3884, and more preferably at least about 2200 cycles to failure. The coating is desirably transparent so that the pre-coated shade of the textile substrate is altered less than about 15%, and more preferably less than about 1%, when the fabric is coated. More particularly, the absolute value of the difference in shade depth of the coated fabric and the textile substrate is less than about 0.2, so that no visible shade change results. A method for producing the fabric and articles incorporating the fabric are also described.

24 Claims, No Drawings

DURABLE COATED FABRIC, METHOD OF MAKING SAME AND PRODUCTS INCORPORATING SAME

FIELD OF THE INVENTION

The invention generally relates to coated fabrics having improved durability and abrasion resistance. More specifically, the invention is directed to coated fabrics having superior abrasion resistance and color properties and good fray resistance, and a process for making such fabrics.

BACKGROUND

With developments in the transportation networks throughout the world, society has become dramatically more mobile and transient. For example, flight travel is now routine rather than infrequent, as both business and leisure travelers undertake millions of flights annually.

One change which has accompanied his progression to a more mobile society is that luggage manufacturers are being challenged to develop baggage items having increasing levels of durability in order to withstand the rigors of travel and commercial baggage handling. As will be readily appreciated by anyone who has ever watched the passenger luggage unloaded from an aircraft, the bags are often subjected to all types of detrimental forces including stacking, tossing, tumbling, crushing, tearing and the like, not to mention variations in temperatures and pressures, and inclement weather.

In fact, it is not uncommon to observe several items from a single flight which have been torn open or otherwise damaged during handling. Coupled with the fact that many travelers often overstuff their bags, luggage manufacturers face a tremendous challenge to produce products which are sufficiently durable to survive a number of trips.

In addition to requiring greater durability, consumers are also demanding that their luggage be lightweight and easy to transport. Therefore, manufacturers are challenged to provide increased product durability without significantly increasing the weight of the products.

One example of luggage manufacturers' attempts to improve luggage durability is that the exterior fabrics used are now commonly made from high denier nylon yarns of the variety used to produce ballistic apparel. In other words, it is seen to be necessary to provide the fabrics for luggage with the same durability which would be needed to withstand the impact of a speeding bullet.

Another example of luggage manufacturers' attempts to enhance the durability of their luggage offerings is that many manufacturers have begun coating their linings with polyurethane. While enhancing the durability significantly as compared with the conventional uncoated fabrics, the urethane coatings have been found to present some problems in and of themselves.

For one, the urethane polymer coatings are typically solvent applied. The urethane solvents are considered to be hazardous chemicals and present environmental concerns. In addition, the urethane coatings tend to alter the shade of the fabrics to which they are applied. As will be readily appreciated by those of ordinary skill in the art, this is undesirable in that it can be difficult to achieve a particular lining color desired and can be difficult to achieve consistent color, both within a single batch and from batch to batch.

Another problem associated with the conventional urethane coated lining fabrics is that they have a tendency to "craze", i.e. to develop highlights or white streaks when wrinkled during handling. In addition, the durability of such fabrics is less than what would be optimal to obtain a truly durable product.

SUMMARY

The instant invention overcomes the deficiencies of similar fabrics by providing an improved coated fabric having superior performance capabilities as compared with the conventional urethane-coated fabrics. in. addition, the fabrics of the instant invention are coated in a manner which alters the pre-coated shade of the fabric less than about 15%, and more preferably less than about 1%. Furthermore, the fabrics of the instant invention do not require the use of hazardous chemicals, and therefore are more environmentally friendly than the conventional coated fabrics.

The fabrics of the instant invention have improved durability, with an abrasion resistance of at least about 750 cycles to failure ("CTF") when tested according to ASTM D 3884. More preferably, the invention has an abrasion resistance of at least about 1000 CTF, even more preferably at least about 2000 CTF, and even more preferably at least about 2200 CTF.

In a preferred form of the invention, the fabric has an initial pre-coated color, and the coating is substantially transparent so that the coated fabric has a shade variation of less than 15% when compared with the uncoated fabric. Even more preferably, the coated fabrics have a shade variation which is less than 5%, and more preferably less than 1% different when compared with that of the uncoated fabric. Preferably, the absolute value of the difference between the depth of shade of the coated fabric and the uncoated textile substrate is less than about 0.4, more preferably less than about 0.3, and more preferably less than about 0.2. In other words, in a preferred form of the invention the change in the shade depth is at a level where it would not be visible to the human eye.

The fabrics of the instant invention also have good fray resistance, both in the warp and fill directions. Preferably, the fraying is less than 1% in each direction when tested according to a Random Tumble fray method.

In addition, the fabrics of the instant invention do not have a tendency to craze like the conventional urethane coated fabrics. Furthermore, the fabrics are desirably solvent-free, such that they are environmentally compatible.

DETAILED DESCRIPTION

In the following detailed description of the invention, preferred embodiments of the invention are described to enable a full and complete understanding of the invention. It will be recognized that it is not intended to limit the invention to the particular preferred embodiment described, and although specific terms are employed in describing the invention, such terms are used in a descriptive sense for the purpose of illustration and not for the purpose of limitation.

As noted above, the fabric of the instant invention desirably includes a textile substrate, to which is bonded a protective coating. The coated fabric desirably is highly resistant to abrasion, has good fray resistance, and does not exhibit a significant shade change as a result of the coating, particularly when compared with prior art coated fabric constructions.

The textile substrate can be of any variety designed to provide good strength and durability properties. In addition, the substrate will typically be selected to be relatively lightweight. In a preferred form of the invention, the textile substrate has a weight on the order of about 0.75 oz/sq yd to about 15 oz/sq yd, and more preferably less than about 5 oz/sq yd, such that the coated fabric has a weight of about 5 oz/sq yd.

The textile substrate can also be of any desired construction designed to provide the requisite functional properties. For example, the substrate can be a plain woven fabric, dobby woven fabric, twill woven fabric, weft knit fabric, warp knit fabric, weft-inserted warp knit fabric, nonwoven fabric, or the like. In a preferred form of the invention particularly useful in the manufacture of luggage linings, the textile substrate is a woven fabric, such as a dobby or a plain woven fabric.

The textile substrate can be manufactured from any types of yarns desired. In a preferred form of the invention particularly useful in the formation of lining fabrics, the substrate is made from polyester fibers or yarns, nylon fibers or yarns, acetate fibers or yarns, or blends thereof. The yarns can be textured or untextured as desired.

The coating is desirably selected to provide the substrate with a high degree of durability, without affecting its weight to a significant extent. Furthermore, the coating is desirably substantially transparent, in order that it does not significantly affect the pre-coated shade of the textile substrate. In addition, the coating also desirably resists crazing arid is environmentally compatible.

In a preferred form of the invention, the coating is substantially urethane-free and non-solvent based, and is selected from the group consisting of ethylene vinyl acetate polymers, polyesters, polyamides, suitable polyolefins such as high and low density polyethylene, metallocene, low density linear and linear low density metallocene, polybutylene, olefin copolymers such as ethylene/methyl acrylate and ethyl/butyl acrylate, ionomeric resins, and blends thereof. In a particularly preferred form of the invention, the coating is an ethylene vinyl acetate polymer. Such polymers are conventionally used as backcoatings for automotive bodycloth fabrics (e.g. those used to form the seating and panels.) However, the instant inventors surprisingly discovered that when used as a face coating on a particular substrate, ethylene vinyl acetate polymer provided a fabric having abrasion resistance superior to that obtained with urethane coatings, with comparable levels of fraying, and with dramatically less shade change than with the conventional urethane coatings.

The coating can be applied in any conventional manner. In a preferred form of the invention, the coating is applied according to a melt coating, process designed to apply thin coatings to substrates (such processes being readily understood by those having ordinary skill in the art.) For example, the process could involve an extrusion coating process, lamination process, or the like. In this way, precise metering of the coating onto the substrate can be achieved at low levels of add-on.

The coating can be applied at any desired level, but is desirably thin in order to minimize the overall weight of the product. Preferably, the coating is applied at a rate of about 0.2 oz/sq yd to about 0.8 oz/sq yd, and more preferably at about 0.5 oz/sq yd.

The fabric can be produced according to the following process: A textile substrate is produced in a conventional manner, such as by weaving, knitting or a nonwoven fabric production process. The fabric can be formed from pre-dyed fibers of yarns or the fabric can be dyed if desired to obtain a predetermined color. The fabric may also optionally be scoured and heatset to remove any excessive process chemicals from fabrication and/or dyeing and to stabilize the material. A coating is applied to the substrate such as by an extrusion coating process designed to apply a thin coating in a consistent, even manner to the fabric. The coating is then cured, to obtain the finished fabric.

In a preferred form of the invention, the fabric has an abrasion resistance of at least about 750 cycles to failure when measured according to ASTM D 3884. Even more preferably, the fabric has an abrasion resistance of at least about 1000 cycles to failure, and even more preferably, at least about 2000 cycles to failure. In a particularly preferred embodiment of the invention, the fabric has an abrasion resistance of at least about 2200 cycles to failure.

The fabric also desirably has good resistance to fraying, and in particular, fray resistance similar to that of the conventional urethane coated fabrics. For example, in a preferred form of the invention, the fabric has a fray resistance of less than 5%, and more preferably less than 1%, in each of the warp and fill directions.

EXAMPLES

Fabric samples were prepared and tested as follows:

Sample A—A fabric constructed in a 68 end ×54 pick dobby weave construction from 150 denier textured polyester yarns in each of the warp and fill, the filling yarns having been pre-dyed. The fabric had an overall weight of 2.65 oz/ sq yd. This fabric was tested in a greige (unfinished) uncoated manner as a control.

Sample B—A fabric like that of Sample A having a polyurethane coating, which represents the current product utilized by luggage manufacturers, was obtained.

Sample C—A fabric like that of Sample A was scoured in heatset in a conventional manner. An ethylene vinyl acetate (EVA) coating was applied to the fabric at a rate of 0.5 oz/sq yd using a hot melt slot coating apparatus in a conventional manner.

Each of Samples A, B and C were tested as follows:

Abrasion Resistance—Abrasion was tested using a Taber Abrasion Test in accordance with ASTM D 3884. The number of cycles to failure (CTF) was tallied for the samples in accordance with the test method, and the results recorded.

Fraying—Fraying was tested as follows: Five circular pieces having 5+/−0.001 inch diameter were cut from each sample fabric. The warp direction was marked for each. Diameter was measured for each specimen and recorded as the original diameter. Each specimen was identified in an area which would not be lost during the test (i.e. near the center.) All 5 circles of the sample were placed in a Random Tumble Chamber and run for 10 minutes. The samples were removed from the Random Tumble Chamber (of the variety commonly used for pilling testing) and the diameter was measured in both the warp and fill direction of the fabric, measuring only the woven fabric. In cases where the entire yarn was not removed, the shortest distance was measured.

The results were listed, with the loss of fabric being identified as measured in the direction of interest. For example, a 10% warp means that 90% of the original fabric remains as measured in the warp direction. A loss of fabric as measured in the warp direction means that the filling yarn is fraying out of the fabric. Loss of fabric in measured direction=A−B/A*100, with A being the original diameter and B being the diameter after fraying.

Depth of Shade and Shade Depth Change—Depth of shade was measured for each sample according to the MTCC colormetric scale as compared with a white tile. As will be appreciated by those of ordinary skill in the art, the lower the number, the darker the shade. The ΔL was calculated by calculating the difference between the coated fabric shade and the control. The percent of shade alteration as a result of the application of the coating was calculated by calculating the difference between the coated shade and the pre-coated shade, dividing by the original shade and multiplying by 100%.

Because the "positive" or "negative" portion of this value is simply an indication of whether the shade was darker or lighter, the absolute value of the ΔL would therefore indicate the amount of shade change from that of the control.

Crazing—Crazing was evaluated by wrinkling the fabrics and visually inspecting them for the appearance of white highlights.

The results for each of the tests are recorded below in Table A.

TABLE A

|  | Sample A (control) | Sample B (urethane) | Sample C (EVA) |
|---|---|---|---|
| Weight (oz/sq yd) | 2.65 | 3.15 | 3.30 |
| Abrasion (CTF) | N/A | 500 CTF | 2200 CTF |
| Fray - warp (%) | 8.5% | 0.40% | 0.96% |
| Fray - fill (%) | 33.2% | 0.40% | 0.88% |
| Depth of Shade (as measured against white tile) | 53.91 | 45.16 | 54.04 |
| ΔL | N/A | −8.75 | 0.13 |
| Depth of Shade change | N/A | ΔL 8.75 | ΔL .13 |
| Crazing | No | Yes | No |

L = Amount of light that is reflected or absorbed.

As noted above in the examples, the fabric of the instant invention had dramatically superior abrasion resistance to that of the uncoated control and that of the conventional urethane-coated fabric. In addition, the fabric of the instant invention had less than 1% fraying in each of the warp and fill directions, which was comparable to that obtained by the urethane coating and dramatically superior to that of the control, which had 33.2% fraying in the fill direction and 8.5% in the warp direction. As Will be readily appreciated by those of ordinary skill in the art, such high levels of fraying can dramatically increase the difficulty and number of quality problems encountered in the converting process, and can effect the durability of the end product as a result of seam failure and the like.

The fabric of the instant invention also had dramatically superior shade change from that of the urethane coated fabric. As will be appreciated by those of ordinary skill in the art, a ΔL which is ≦0.2 in either the positive or negative direction is not considered to be visible to the human eye. In fact, only a trained eye can generally see a change which is ±0.3. Therefore, the fabric of the instant invention did not undergo a shade change as a result of coating which would be visible, while the urethane product had a visible and significant shade change. As a result, manufacturers using the fabric of the instant invention can be assured of the retention of the original color of their fabric, and face less variations. In addition, superior batch and lot-to-lot fabric consistency can be obtained.

As will also be noted, the fabric of the instant invention did not craze like that of the urethane coated fabrics. This not only enhances the fabric's durability, but prolongs its aesthetic appearance and perception of "newness."

Furthermore, the fabrics of the instant invention are significantly more environmentally compatible than those of the prior urethane constructions, due in part to the fact that the coating is not solvent applied.

While the fabrics of the instant invention have been described particularly in connection with their use as lining materials such as luggage linings, it is to be noted that the fabrics would also have specific utility in a variety of other end uses. For example, the fabrics could be used in the production of labels, graduation gowns, outdoor recreation items and articles, and the like.

In the specification there has been set forth a preferred embodiment of the invention, and although specific terms are employed, they are used in a generic and descriptive sense only and not for the purpose of limitation, the scope of the invention being defined in the claims.

We claim:

1. A fabric particularly for use in linings of articles, said fabric consisting of:
   a textile substrate having a weight of about 0.75 oz/sq yd to about 15 oz/sq yd, an upper and lower surface, and a pre-coated color shade; and
   an ethylene vinyl acetate polymer coating secured to said upper surface of said textile substrate, said coating being provided at about 0.25 oz/sq yd to about 5 oz/sq yd, said coating being substantially transparent such that said coating alters the pre-coated color shade of the fabric less than about 15%.

2. A fabric according to claim 1, wherein said coating alters the pre-coated color shade of the fabric less than about 10%.

3. A fabric according to claim 1, wherein said coating alters the pre-coated color shade of the fabric less than about 5%.

4. A fabric according to claim 1, wherein said coating alters the pre-coated color shade of the fabric less than about 1%.

5. A fabric according to claim 1, wherein said fabric has an abrasion resistance of at least about 750 cycles to failure when tested according to ASTM D 3884.

6. A fabric according to claim 1, wherein said fabric has an abrasion resistance of at least about 2000 cycles to failure when tested according to ASTM D 3884.

7. A fabric according to claim 1, wherein said textile substrate comprises a woven polyester fabric.

8. A fabric according to claim 1, wherein said textile substrate comprises a woven nylon fabric.

9. A fabric according to claim 1, wherein said fabric has a fray of less than 1% in each of the warp and fill directions when tested according to a Random Tumbling fray procedure.

10. An article of luggage having a lining comprising the fabric of claim 1.

11. A fabric according to claim 1, wherein said textile substrate has a weight of about 0.75 oz/sq yd to about 5 oz/sq yd.

12. A coated fabric particularly for use as a lining material consisting of:
   a textile substrate; and
   an ethylene vinyl acetate polymer coating provided on at least a first surface of said textile substrate, wherein said fabric has an abrasion resistance of at least about 750 cycles to failure when tested according to ASTM D 3884, and said fabric having an overall weight of about 5 oz/sq yd or less.

13. A fabric according to claim 12, wherein said fabric has an abrasion resistance of at least about 1000 cycles to failure.

14. A fabric according to claim 12, wherein said fabric has an abrasion resistance of at least about 2000 cycles to failure.

15. A fabric according to claim 12, wherein said fabric has an abrasion resistance of at least about 2200 cycles to failure.

16. A fabric according to claim 12, wherein said textile substrate comprises a woven fabric selected from the group consisting of polyester fabrics, nylon fabrics, acetate fabrics, and blends thereof.

17. A fabric according to claim 12, wherein said textile substrate is selected from the group consisting of plain woven fabrics, dobby woven fabrics, twill woven fabrics, weft knit fabrics, warp knit fabrics, weft-inserted warp knit fabrics, and nonwoven fabrics.

18. A fabric according to claim 12, wherein said fabric frays less than 1% in each of the warp and fill directions when tested according to a RandomTumbling fray procedure.

19. An article of luggage having a lining comprising the fabric of claim 12.

20. A fabric according to claim 12, wherein the absolute value of the difference between the shade depth of the coated fabric as compared with the shade depth of the textile substrate is less than about 0.4.

21. A fabric according to claim 20, wherein the absolute value of the difference between the shade depth of the coated fabric and that of the textile substrate is less than about 0.3.

22. A fabric according to claim 21, wherein the absolute value of the difference between the shade depth of the coated fabric and that of the textile substrate is less than about 0.2.

23. A fabric according to claim 12, wherein said coating is substantially transparent such that the coating alters the pre-coated color shade of the textile substrate less than about 5%.

24. A fabric according to claim 23, wherein said coating is substantially transparent such that the coating alters the pre-coated color shade of the textile substrate less than about 1%.

* * * * *